July 15, 1969
W. B. WOLF
3,455,572
STEERING STRUCTURE FOR VEHICLES
Filed Jan. 26, 1967
3 Sheets-Sheet 1
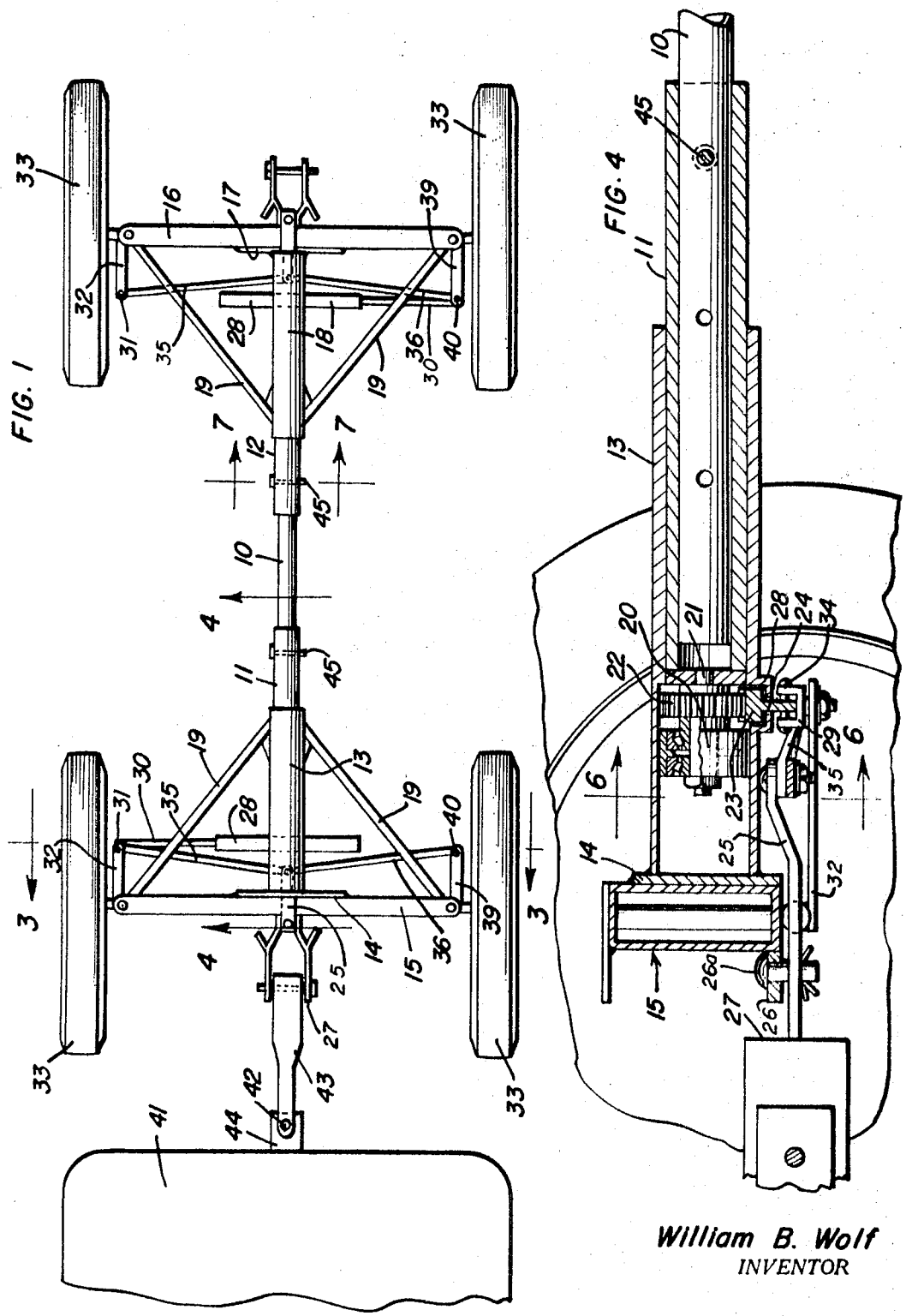
William B. Wolf
INVENTOR

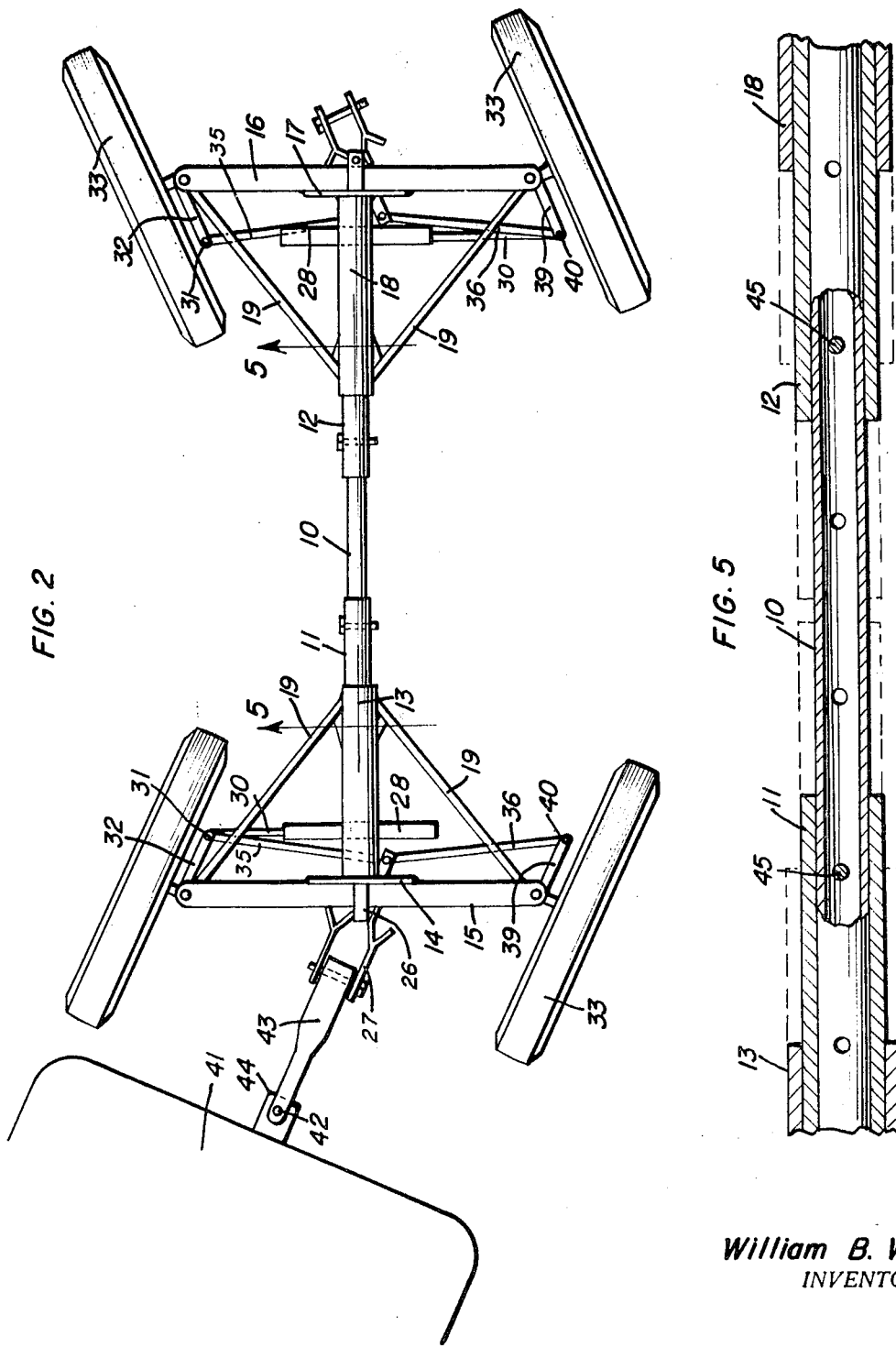

July 15, 1969 W. B. WOLF 3,455,572
STEERING STRUCTURE FOR VEHICLES
Filed Jan. 26, 1967 3 Sheets-Sheet 3
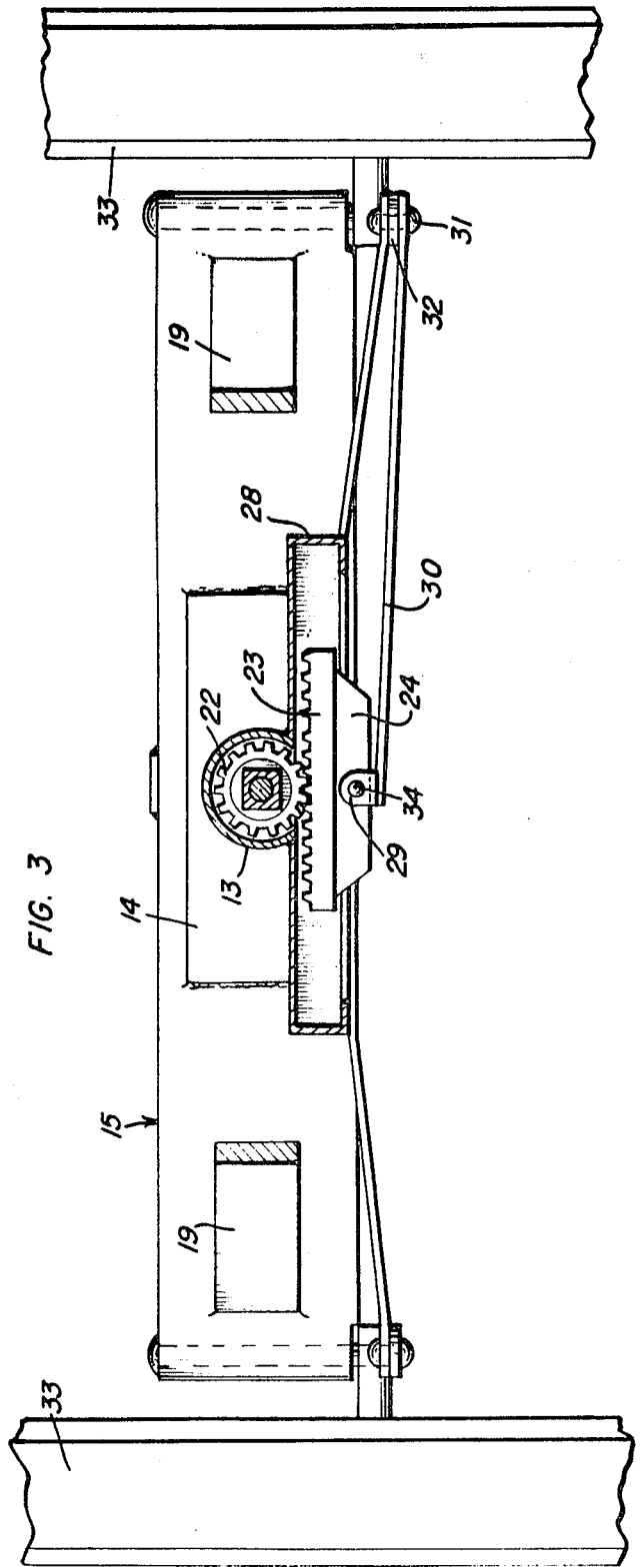
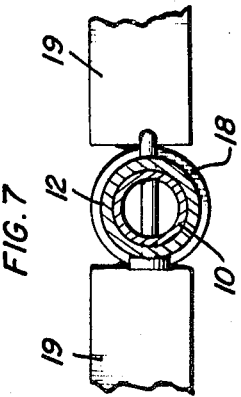
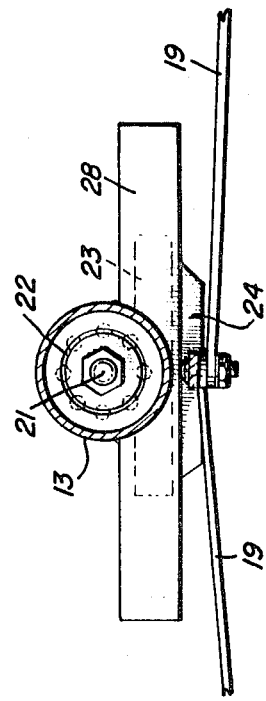
William B. Wolf
INVENTOR

United States Patent Office 3,455,572
Patented July 15, 1969

3,455,572
STEERING STRUCTURE FOR VEHICLES
William B. Wolf, 1229 12th Ave., Grafton, Wis. 53024
Filed Jan. 26, 1967, Ser. No. 611,910
Int. Cl. B60b 37/00
U.S. Cl. 280—99     3 Claims

ABSTRACT OF THE DISCLOSURE

Towed four-wheel vehicle steering mechanism wherein front and rear sets of wheels are gear linked to steer in opposite directions when either set of wheels is turned.

---

This invention relates to steering structures, and more particularly, to a steering structure for vehicles.

There are two basic types of steering structures for vehicles, namely, the two-wheel type and the four-wheel type. It is the four-wheel type to which this invention applies. Although a number of this type of steering structures has been developed over the years, they all appear to have complicated mechanisms that are both costly to manufacture and to maintain.

It is, therefore, the principal object of this invention to provide a steering structure for vehicles that turn all four wheels of the vehicle in a way that permits the rear wheels to follow in the path of the front wheels.

Another object of this invention is to provide a steering structure for vehicles that will permit any wagon or the like, to which this invention is adapted, to turn in a very short radius.

Another object of this invention is to provide a steering structure for vehicles that will permit the vehicle to be made considerably longer than is possible with steering structures now on the market.

Another object of this invention is to provide a steering structure for vehicles that can be adapted to any four wheeled vehicle no matter what it may be, the type of power it may have, or the type of body that may be secured to the same.

Still another object of this invention is to provide a steering structure for vehicles that contains a minimum number of simple parts that can be maintained by nearly any mechanic or the like.

Other and further objects and advantages of this invention will come to mind as the specification is read and the accompanying drawings are examined.

In the drawings:

FIG. 1 is a top view of this invention, adapted to a wagon frame, being towed by a tractor or the like.

FIG. 2 is a top view of this invention, similar to FIGURE 1, but with four wheels set at any angle for the wagon to make a right turn.

FIG. 3 is a sectional view of this invention, taken substantially along line 3—3 of FIGURE 1, and viewed in the direction indicated by the arrows.

FIG. 4 is a sectional view of this invention, taken substantially along line 4—4 of FIGURE 1, and viewed in the direction indicated by the arrows.

FIG. 5 is a sectional view of this invention, taken substantially along line 5—5 of FIGURE 2, and viewed in the direction indicated by the arrows.

FIG. 6 is a sectional view of this invention, taken substantially along line 6—6 of FIGURE 4, and viewed in the direction indicated by the arrows.

FIG. 7 is a sectional view of this invention, taken substantially along line 7—7 of FIGURE 1, and viewed in the direction indicated by the arrows.

In the accompanying drawings, like reference characters refer to like parts throughout the several views.

Referring to the drawings, and more particularly to FIGURES 1 and 2, it will be seen that this invention embodies a tubular reach 10 that has its front end projecting into the tubular drive reach 11 while the rear end of the same reach 10 projects into the tube 12. The aforesaid drive reach 11 in turn projects into the tubular gear housing 13 which has its front end suitably secured to the center of the vertically disposed plate 14. The vertically disposed plate 14 is welded, or otherwise fastened, to the vertical surface of the front axle 15 which is a rectangular hollow member, as is clearly shown in FIGURE 4 of the drawings. The rear axle 16, which is identical in construction to the front axle 15, is secured to the rectangular plate 17 that is centrally located in the lateral plane in relation to the rear end of the tubular member 18 in which is placed the major portion of the aforesaid tube 12, as is clearly shown in FIGURE 1 and in FIGURE 2 of the drawings. Both the aforesaid front axle 15 and the rear axle 16 are braced by identical diagonal members 19 in the manner shown in the accompanying drawings.

Looking now at the heart of this invention, the mechanism so clearly shown in FIGURE 4 of the drawings, it is seen that the drive reach 11 has its front end adapted to receive a bearing holder 20 that is welded, or otherwise fastened, to the gear housing 13 in which is located two tapered thrust bearings. These are mounted so that one of the bearings is opposite the other bearing, thereby providing the necessary strength to maintain gear position under extreme torque and pulling pressures in rotating the aforesaid tubular reach 10.

The outer end of a threaded rod 21 passes through a gear 22 which has its teeth engaging a rack 23 whose lower surface is secured to the upper surface of a rack bar 24. A link bar 25 is pivotally secured to an axle plate 26 by pin 26a. The front of link bar 25 is secured to the rear end of a longitudinally disposed yoke 27. The aforesaid rack 23 is slidably enclosed within the rack housing 28, as is clearly shown in FIGURE 3 of the acompanying drawings. Means are provided for linking the rack to the tie rods or to wheel attaching means. For example a vertically disposed lug 29 is secured to rack bar 24 and to the upper surface and inner end of a tie rod 30. This tie rod 30 has its outer end secured by the vertically disposed pin 31 to the right hand wheel pivoting arm 32, thereby providing the means either of turning the wheels 33 or of following the turning of wheels 33 of the vehicle, which in this particular instance, is a wagon. The aforesaid lug 29 is obviously secured to the aforesaid rack bar 24 by means of the pin 34.

Returning now FIGURES 1 and 2 of the accompanying drawings, it will be seen that a laterally disposed tie rod 35 has its inner end suitably pinned to both the inner end of tie rod 36 and to the bar 25 which then projects frontward to terminate between the vertically disposed sides of the yoke 27. The outer end of the aforesaid tie rod 35 is secured to the aforesaid right hand arm 32 by the already mentioned pin 31, while the outer end of tie rod 36 is likewise secured to the left hand arm 39 by means of the vertically disposed pin 40.

From the above description of the construction of this unusually novel construction of a steering structure for vehicles, when read in connection with the examination of the accompanying drawings, it is seen and realized that when the wagon or the like having this invention is secured to the rear of the towing vehicle 41 by means of the vertically disposed yoke pin 42 passing downward through the outer end of the pole 43 and the draw bar 44, and the towing vehicle is turned to the right, as in FIGURE 2 of the accompanying drawings, the aforesaid bar 25, being connected to both the aforesaid yoke 27 and the tie rods 35, will turn the two front wheels of the wagon and at the same time cause the tie rod 30 to move the rack 23, thereby turning the aforesaid gear 22 which, as has been previously described, connected to the drive reach 11 which in turn is secured to the front end of the aforesaid tubular reach 10 by means of the reach pins 45. The two rear wheels of the wagon will now turn in the direction shown in FIGURE 2 of the drawings by identical mechanism as that connecting the front wheels.

From the foregoing, it is seen that I have provided a steering structure for vehicles and the like that fulfills all of the objects of this invention, and others that will no doubt come to mind, and that this invention is subject to any and all changes and/or modifications one may care to make in both its details and assemblies in so long as the changes and/or modifications fall within the scope and intent of the appended claims.

What I now claim as new and desire to secure by Letters Patent is:

1. A multiple axle towed vehicle steering device comprising:
   a first and a second axle,
   attaching means for rotatably and pivotally attaching wheels at each end of said axles,
   geared linkage means attached to at least one of said wheel attaching means at each of said axles for following the movement of said at least one of said wheel attaching means,
   longitudinally disposed reach means extending from the geared linkage means at said first axle to the geared linkage means at said second axle,
   towing yoke means at each of said axles,
   tie bar means at each axle pivotally coupled to said attaching means and to said geared linkage means,
   means for coupling each of said towing yoke means to said tie bar means,
   said geared linkage means comprising pinion gear means,
   means for fixedly attaching said reach means to said pinion gear means,
   said pinion gear means geared to rack gear means,
   means for attaching said rack gear means to said at least one wheel attaching means,
   second reach means provided for enclosing each end of said longitudinally disposed reach means, and
   bearing means mounted on the outer end of said second reach means wherein said bearing means rotatably support said pinion gear.

2. The multiple axle towed vehicle steering device of claim 1 wherein tubular gear housing means are provided for rotatably supporting said second reach means, vertically disposed plate means attached to said axle means, and
   means for fastening one end of said tubular gear housing means to said plate means.

3. The multiple axle towed vehicle steering device of claim 2 wherein a horizontally disposed threaded rod extends through the center of said pinion gear means and said bearing means thereby connecting the said pinion gear means with one end of the said second reach means.

References Cited

UNITED STATES PATENTS

| | | | |
|---|---|---|---|
| 1,276,422 | 8/1918 | Scott et al. | 280—99 |
| 1,442,342 | 1/1923 | Hines | 280—99 |
| 2,497,357 | 2/1950 | Hunt | 280—99 |
| 2,572,966 | 10/1951 | Avery | 280—99 |
| 2,746,760 | 5/1956 | Wolf | 280—99 |
| 3,211,467 | 10/1965 | Siddall | 280—445 X |

FOREIGN PATENTS 1,021,958 12/1952 France.

LEO FRIAGLIA, Primary Examiner

U.S. Cl. X.R.

280—444